UNITED STATES PATENT OFFICE.

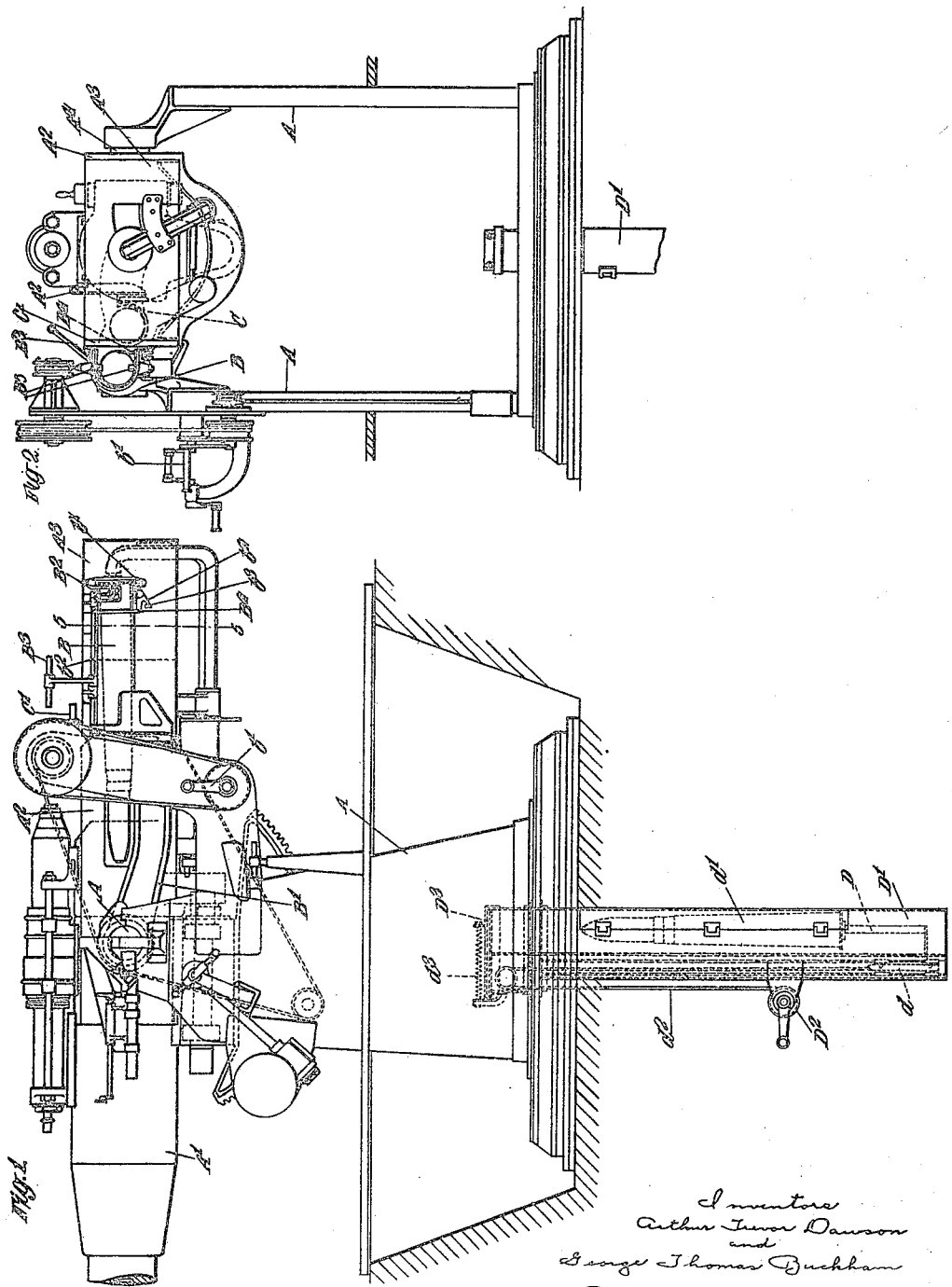

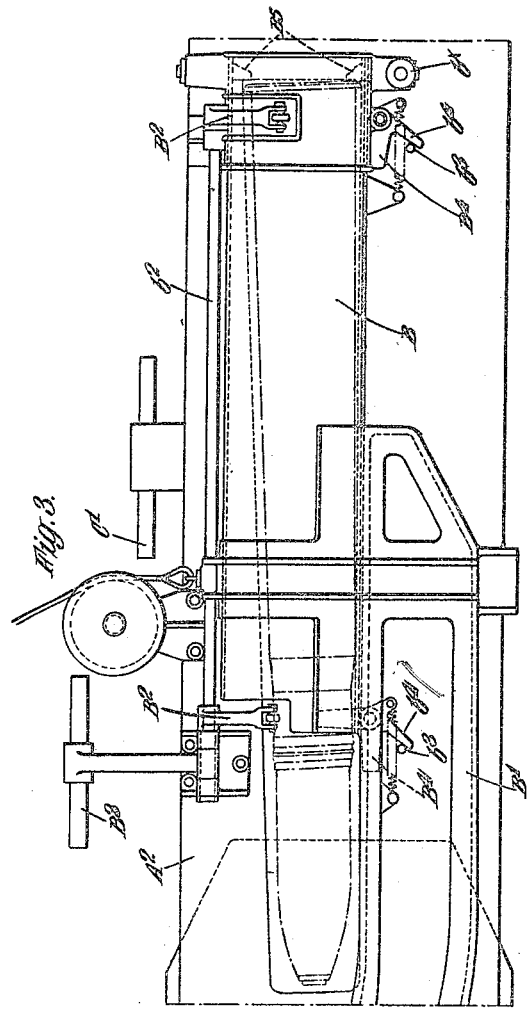
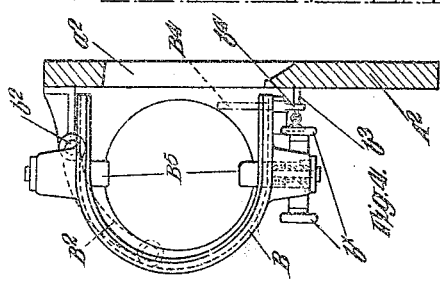

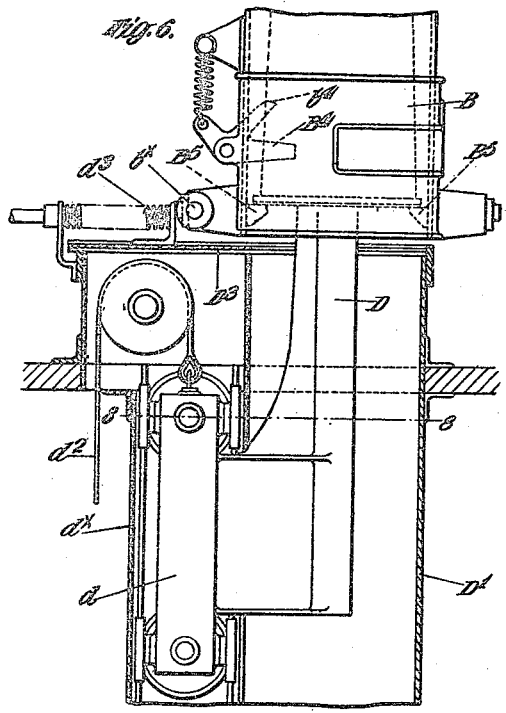
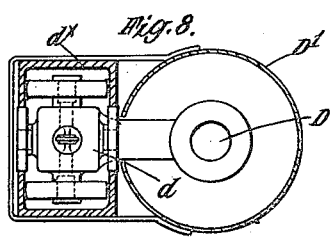
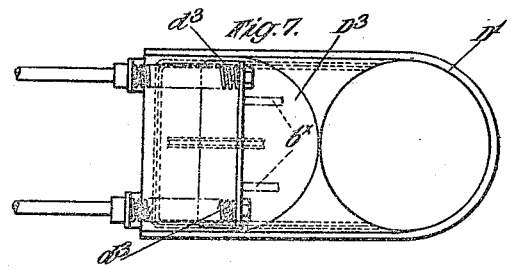
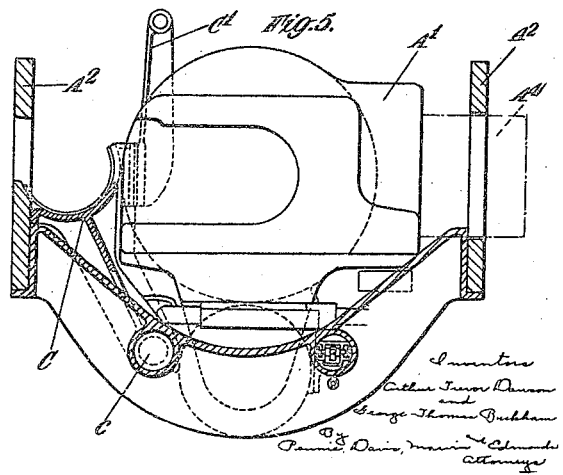

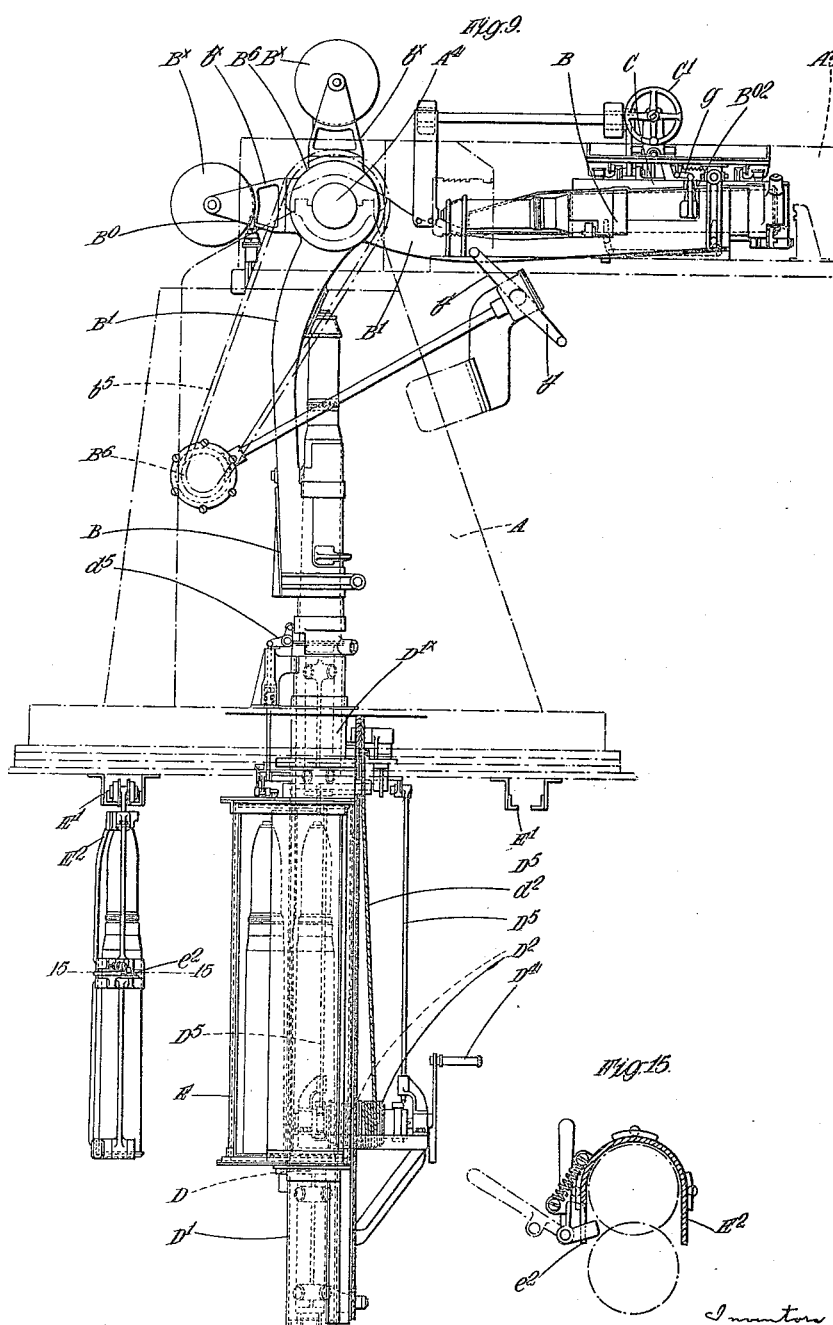

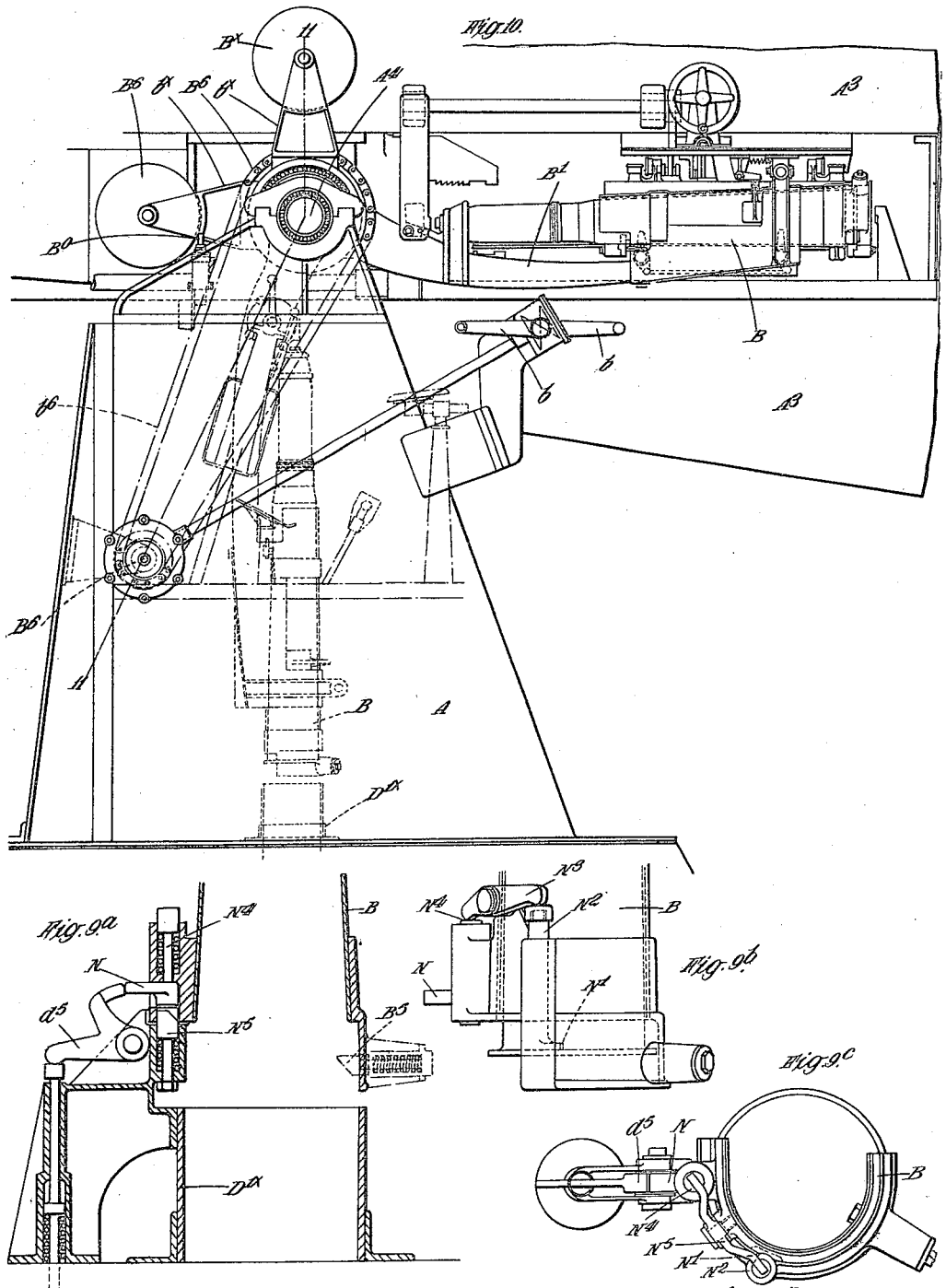

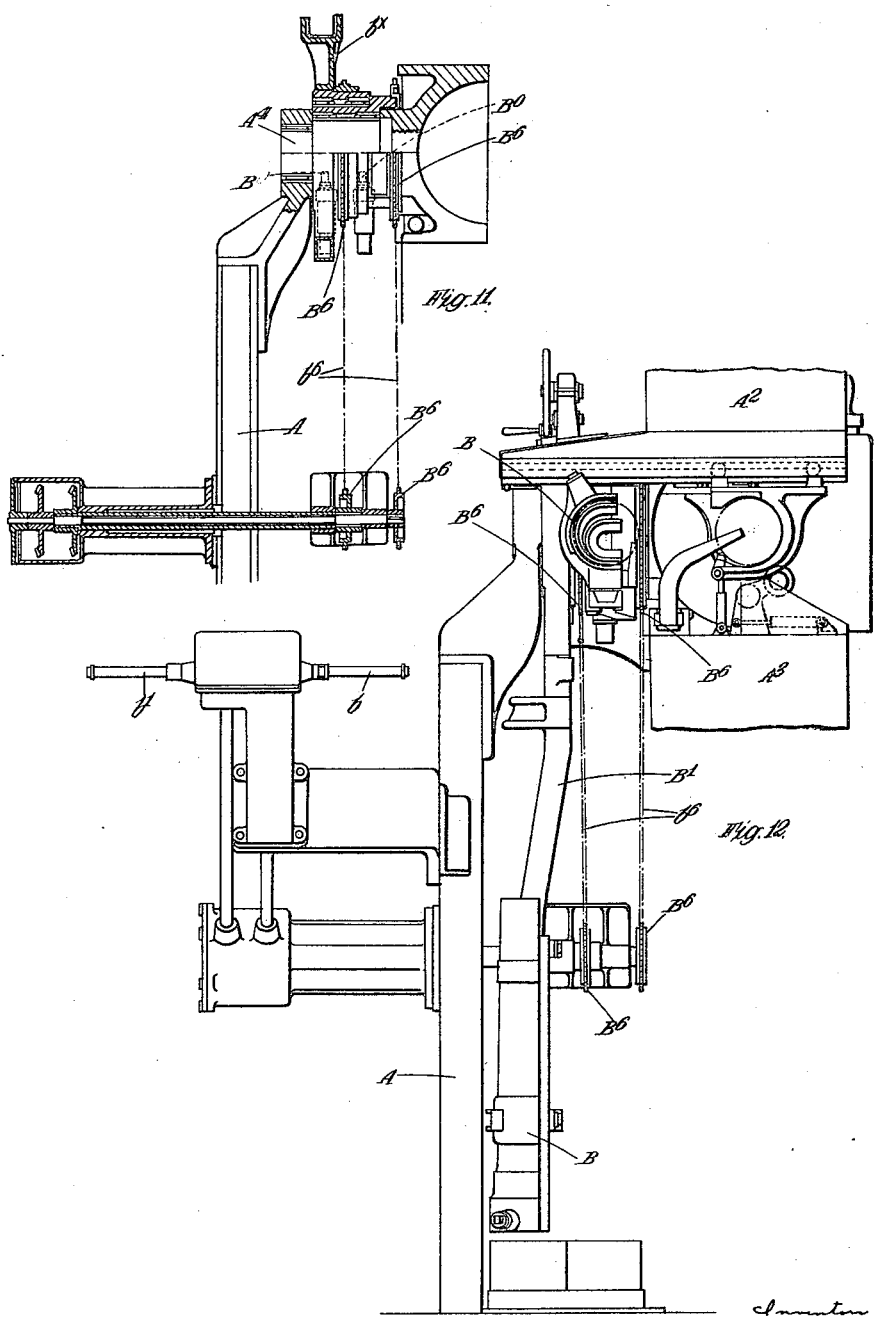

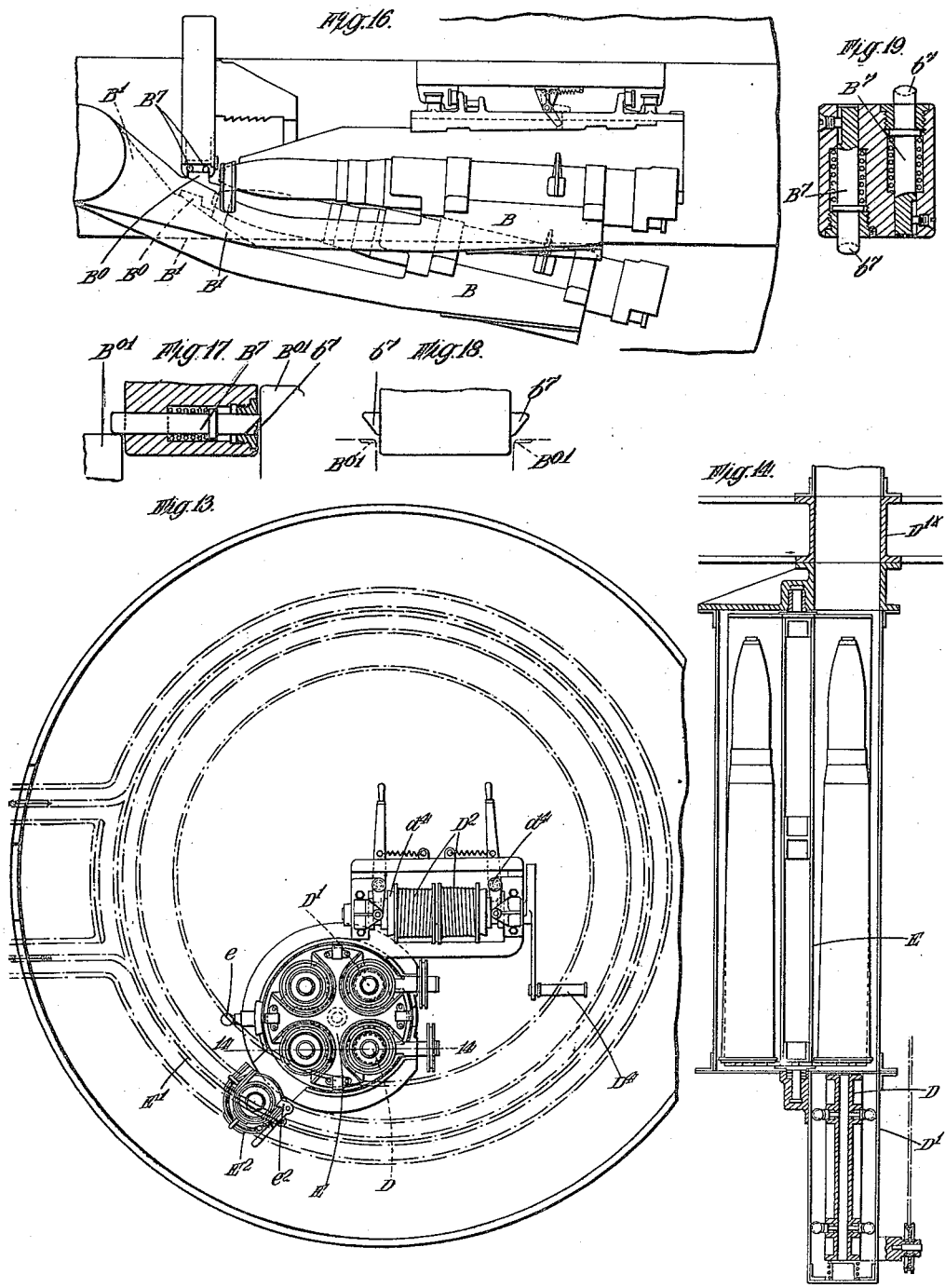

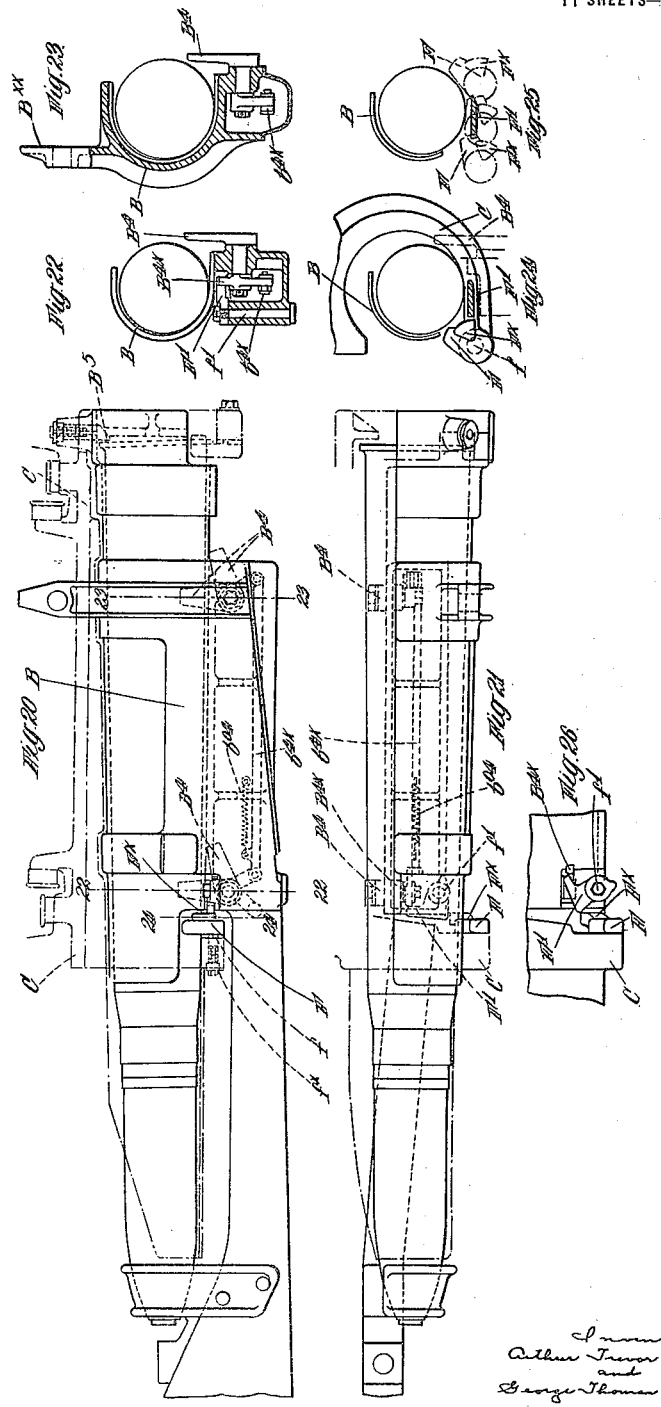

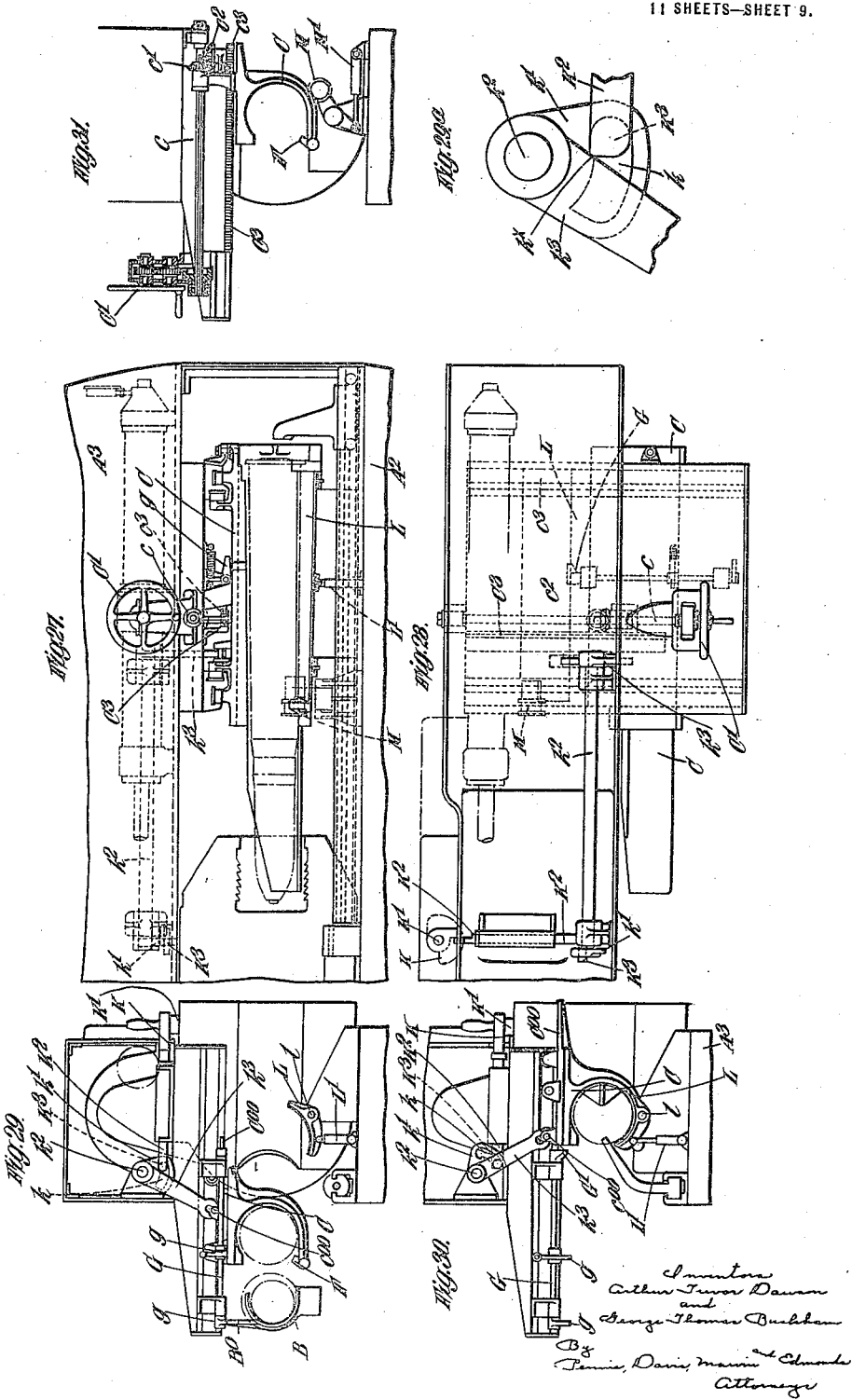

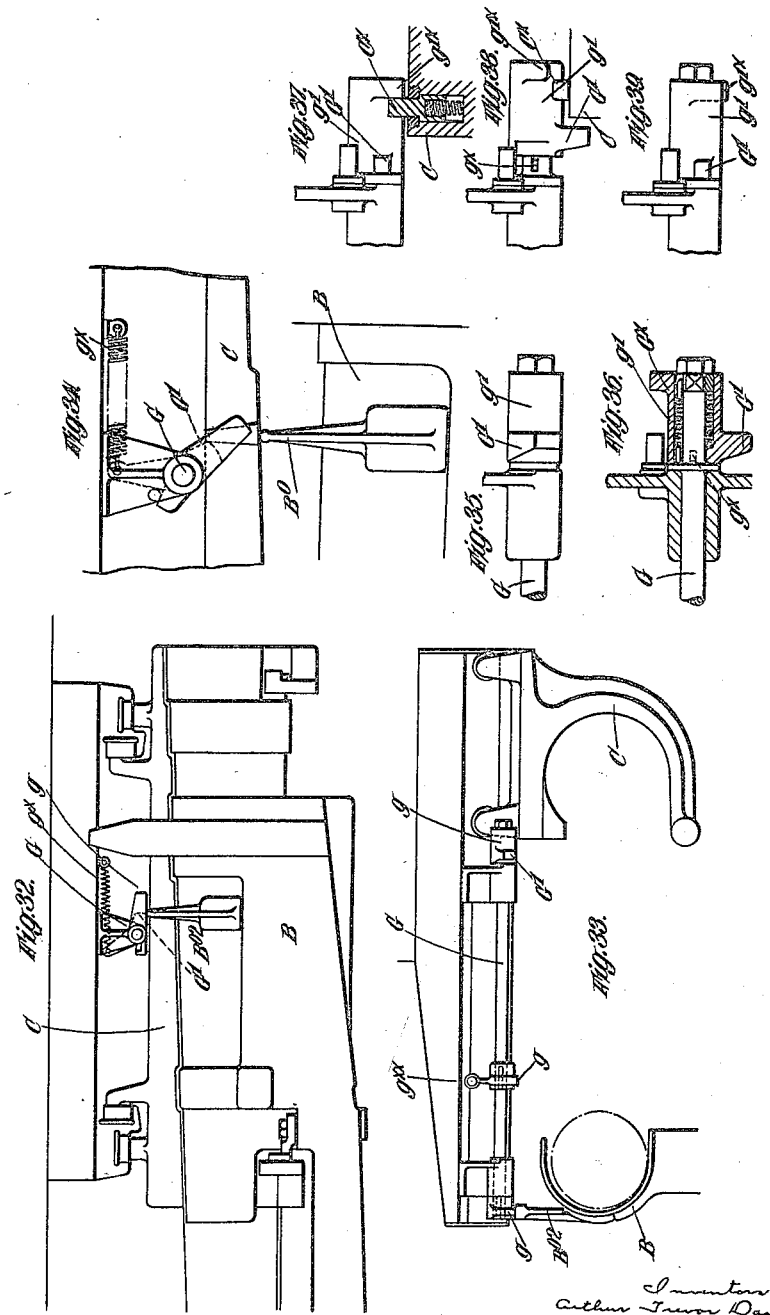

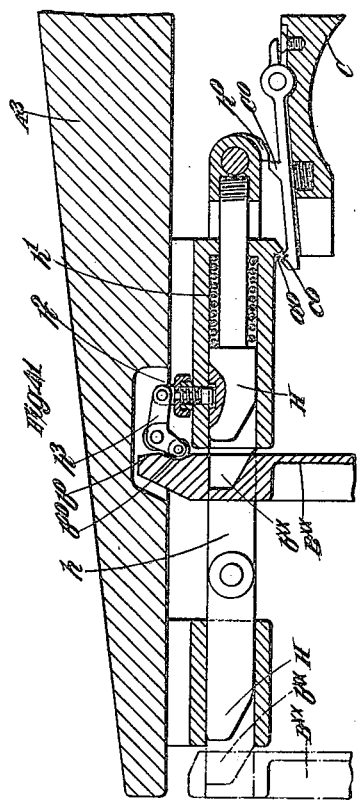
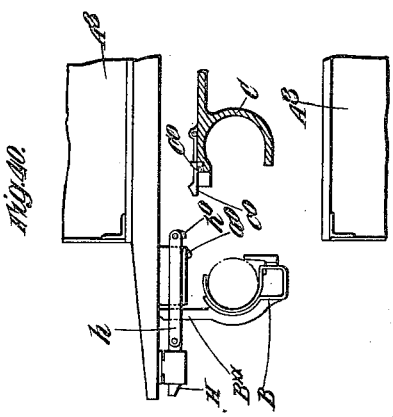

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, LONDON, ENGLAND.

AMMUNITION HOISTING AND LOADING APPARATUS FOR ORDNANCE.

1,422,678. Specification of Letters Patent. Patented July 11, 1922.

Application filed October 26, 1921. Serial No. 510,654.

*To all whom it may concern:*

Be it known that we, ARTHUR TREVOR DAWSON and GEORGE THOMAS BUCKHAM, both subjects of the King of Great Britain, residing at Vickers House, Broadway, Westminster, in the county of London, England, have invented certain new and useful Improvements in or Relating to Ammunition Hoisting and Loading Apparatus for Ordnance, of which the following is a specification.

This invention relates to ammunition hoisting and loading apparatus for ordnance, particularly for naval anti-aircraft ordnance using fixed or case ammunition.

According to the invention the ammunition is raised to the gun by a tray (herein termed the lifting tray) carried by an arm which is mounted, preferably on one of the trunnions in a position between the cradle and the side cheek of the carriage or in certain cases in a position outside the side cheek, so as to swing about a transverse axis from a receiving position in which the tray depends vertically into a transferring position in which the tray lies parallel to the axis of the gun, the latter position being determined by a stop on the cradle or a part attached thereto so that "all angle" loading is provided. When the lifting tray is in the transferring position the ammunition thereon is transferred by suitable means to a transversely movable loading tray carried by the cradle or by a balance weight supported from the cradle by rearwardly extending arms as described in the specification of our British patent application No. 23340 of 1920, this loading tray carrying the ammunition into a position in line with the bore of gun so that the ammunition may be rammed therein. The said loading tray may be mounted to swing about a longitudinal axis and the ammunition in the lifting tray may be caused to roll on to this loading tray by the operation of a hand lever one arm of which bears against the ammunition but in the preferred construction the loading tray is adapted to move transversely in a rectilinear path and is provided with a withdrawing device which, when the loading tray reaches its receiving position, will engage with the ammunition in the lifting tray and withdraw it therefrom, the ammunition being then in the proper position in the loading tray for ramming into the gun when the latter tray reaches its loading position. The ammunition is preferably placed in position on the aforesaid lifting tray directly from a hoist arranged immediately beneath and in line with the said tray when the latter occupies its vertical or receiving position, this hoist comprising a rammer operating to ram the ammunition nose first into the lifting tray where it is held by the engagement of spring controlled plungers with the base of the cartridge case. In the preferred arrangement the ammunition may be carried beneath the deck in a rotary magazine provided with a number of vertical compartments and disposed in such a position that any one of the compartments can be brought into the required position for ramming the ammunition therein into the lifting tray.

The invention also comprises the interlocking and safety devices and other features hereinafter described.

In order that the said invention may be clearly understood and readily carried into effect, the same will now be described more fully with reference to the accompanying drawings, in which:—

Figures 1 and 2 are respectively a side elevation and a rear elevation shewing one form of our improvements in which a single lifting tray is employed, this tray being shewn in the transferring position.

Figure 3 is a side elevation shewing the lifting tray of Figure 1 on a larger scale, Figure 4 is a rear elevation of the lifting tray of Figure 3, Figure 5 is a section taken approximately on the line 5, 5 of Figure 1 and drawn to a larger scale, the lifting tray not being shewn in this figure, Figure 6 is a sectional side elevation, shewing the arrangement of the hoist and the manner of placing the ammunition in the lifting tray which is shewn in the receiving position, Figure 7 is a plan of Figure 6 with the lifting tray removed, Figure 8 is a section taken approximately on the line 8, 8 of Figure 6, Figure 9 is a side elevation shewing another form of our improvements in which two lifting trays, a rotary magazine and a transversely sliding loading tray are employed Figure 9a is a vertical section of part of Figure 9 hereinafter referred to.

Figure 9b is an elevation of Figure 9a but with certain of the parts in a different position, Figure 9c is a plan of Figure 9a, Figure 10 is an enlarged view of the upper part of Figure 9, Figure 11 is a section taken approximately on the line 11—11 of Figure 10, Figure 12 is a rear elevation of the upper part of Figure 10, Figure 13 is a plan drawn to an enlarged scale of the rotary magazine and its associated parts shewn in Figure 9, Figure 14 is a section taken approximately on the line 14—14 of Figure 13, Figure 15 is a section taken approximately on the line 15, 15 of Figure 9 and drawn to a larger scale, Figure 16 is a side elevation shewing an arrangement of safety stops for the lifting trays, Figures 17, 18 and 19 are detail views on a larger scale of the said safety stops, Figure 20 is a side elevation drawn to a larger scale of one of the lifting trays of Figure 9, Figure 21 is a plan of Figure 20, Figures 22, 23 and 24 are sections taken on the lines 22—22, 23—23, and 24—24 respectively of Figure 20, Figure 25 is a view similar to Figure 24 shewing different positions of the device illustrated thereby, Figure 26 is a side elevation of part of Figure 21, Figure 27 is a side elevation shewing the loading tray of Figure 9 and its associated parts, Figure 28 is a plan of Figure 27, Figure 29 is a rear elevation of Figure 27 shewing the loading tray displaced from its loading position behind the gun.

Figure 29a is an enlarged view of a detail of Figure 29,

Figure 30 is a view similar to Figure 29 shewing the loading tray in its loading position, Figure 31 is a sectional rear elevation shewing the means for moving the loading tray, Figures 32 and 33 are respectively a side elevation and a rear elevation shewing the operation of a safety arrangement for preventing the loading tray from being displaced from its loading position unless either of the lifting trays is in the correct transferring position, Figure 34 is an enlarged side elevation of part of Figure 32, Figure 35 is an enlarged view of the stop-piece forming part of the said safety arrangement, Figure 36 is an axial section of Figure 35, Figures 37, 38 and 39 are side views shewing the stop-piece in different positions hereinafter described.

Figure 40 is a rear elevation shewing an arrangement for locking the lifting trays in their transferring position, and Figure 41 is a section shewing the said locking arrangement on a larger scale.

A is the gun carriage, A' is the gun cradle, $A^2$, $A^2$ are rearwardly extending arms on the gun cradle which arms carry a balance weight $A^3$ as is described in our aforesaid concurrent specification and $A^4$, $A^4$ are the cradle trunnions. B is the lifting tray carried by an arm B' which in the examples shewn is pivotally mounted on the left hand trunnion in a position between the cradle and the left hand side cheek of the carriage. C is a transversely movable loading tray and D is the rammer for loading ammunition into the lifting tray B.

Referring to Figures 1 to 8 which shew an arrangement in which only one lifting tray is employed, this tray is moved from its receiving position (Figure 6) to its transferring position (Figures 1 to 5) by an arrangement of cables and winch operated by a crank b' as shewn in Figures 1 and 2, the transferring and receiving positions being determined by suitable stops. The said tray is of approximately C shape in cross-section when viewed from the rear (see Figures 2 and 4) and discharges the ammunition on to the loading tray C through a gap $a^2$ in the left hand arm $A^2$ on the cradle. In this construction the loading tray C is pivoted by means of a spindle c (Figure 5) arranged parallel to the axis of the gun and is rocked about its pivot by means of a handle C'. The ammunition is transferred from the lifting tray B to the loading tray C by arms $B^2$, $B^2$ carried by a spindle $b^2$ having an operating handle $B^3$ which is shewn as being mounted in different positions on the spindle $b^2$ in Figures 1 and 3, and which can obviously be mounted in any other desired position.

The ammunition is prevented from rolling out of the lifting tray B until the latter reaches its transferring position by spring controlled retaining levers $B^4$, $B^4$ pivoted to the tray and provided with extensions $b^4$, $b^4$ adapted to engage with pins $b^3$, $b^3$ on part of the cradle as the tray reaches its transferring position, to displace the said levers into the free position as shewn in Figure 3.

The rear part of the tray B is provided with spring plungers $B^5$, $B^5$ for preventing the ammunition from falling out rearwards from the tray, these plungers having bevelled rear faces (see Figures 3 and 6) to enable the plungers to be pressed back by the ammunition during its insertion into the tray by the rammer D.

The rammer D is disposed in a tube D' arranged beneath the deck in line with the lifting tray when the latter is in the receiving position and is operated by the arrangement of winch $D^2$ and rope $d^2$ shewn in Figure 1. The said rammer is connected to a crosshead $d$ carrying rollers which move in contact with the walls of a compartment $d^x$ attached to the tube D' as shewn in Figures 6 and 8. The tube D' is provided with a door $d'$ (Figure 1) to enable the ammunition to be placed in the tube with the base resting on the rammer head.

At the upper end of the tube D' there is a sliding door $D^3$ which normally closes this tube to prevent water from entering, this door is automatically opened by rollers $b^x$, $b^x$ on the lifting tray when the latter assumes its receiving position and is closed by springs $d^3$, $d^3$ when the tray moves from this position.

Referring to Figures 9 to 12 two lifting trays B, B are provided and are pivoted coaxially at the left-hand side of the gun. These trays are shewn as being operated independently of each other by mechanism including sprocket wheels $B^6$, $B^6$ and chains $b^6$, $b^6$, the lower sprocket wheels being carried by shafts operated through bevel gearing from the crank handles $b'$, $b'$ and the upper ones being carried by the trays. A balance weight $B^x$ is provided on an arm $b^x$ extending in front of the pivots of each of the trays for balancing the weight of the tray together with half the weight of the ammunition; a dash pot or buffer $B^0$ is provided for each of these arms and is adapted to be operated as each tray reaches its transferring position. In conjunction with these two trays we employ two rammers D, D arranged beneath the deck as aforesaid, the trays when in their receiving or vertical position being situated vertically above two of the compartments of the rotary magazine E which will be described later. The rammers are operated from a single crank handle $D^4$ through two winches $D^2$, $D^2$ and ropes $d^2$, $d^2$ either of which winches can be connected to the crank handle by means of clutches $d^4$, $d^4$ (see Figure 13.) Locking devices in the form of rods $D^5$, $D^5$ suitably connected to bell crank levers $d^5$, $d^5$ are provided for preventing either of these clutches from being moved to the clutching position when the lifting tray appertaining to the rammer to which that particular clutch relates is not in the correct receiving position, the locking rod being moved to its free position when the lifting tray assumes its correct position but only when it is empty. The said locking rods $D^5$, $D^5$ instead of co-operating with the clutches, may be arranged to co-operate with the winches themselves so as to positively prevent improper actuation of these winches. The means for ensuring that the locking rods shall be moved to the free position as above described only when the lifting trays are empty, are shewn in Figures $9^a$, $9^b$ and $9^c$ and comprise a striker N on the tray which striker occupies the position shewn in Figure $9^a$ so that it can operate the bell crank lever $d^5$ only when the lifting tray is empty. When the tray is full the rim of the cartridge bears against a projection N' on a rod $N^2$ which operates through a lever $N^3$ and a spring plunger $N^4$ carrying the striker N to hold the latter in a position in which it will not operate upon the bell crank lever $d^5$.

A spring catch $B^5$ is shewn for holding the lifting tray in the receiving position. This catch is moved to its disengaging position by the lever part of the plunger $N^4$ when the latter is moved downwardly, i. e., when the ammunition has been loaded into the tray. In Figures $9^a$ and $9^c$ the position of the parts is that which they assume when the tray is empty and in Figure $9^b$ that which they assume when the tray is full.

Safety stops in the form of spring controlled bolts $B^7$, $B^7$ (see Figures 16 to 19) each having a beveled face for operation by the lifting trays as they assume the transferring position, are provided for the purpose of preventing either of these trays from reaching this position whilst the other tray occupies the transferring position, one of the said bolts projecting into the path of a part $B^{01}$ of the arm B' of one of the trays as shewn in Figure 17 when the other tray is in the transferring position.

The rotary magazine E in the construction shewn has four compartments and is pivoted in such a position that any one of these compartments can be brought into position between the rammer tube D' and another tube $D'^x$ (Figures 9 and 10) arranged above the magazine. The latter tube may have a sliding door as described above. A suitable spring catch $e$ (Figure 13) is provided for determining the position of the magazine in which its compartments are in the correct ramming position. This magazine is rotatably carried by a part moving with the gun in training and is supplied with ammunition by means of a stationary runway or rail E' carried beneath the deck and adapted to receive the upper part of a carrier $E^2$ in which the ammunition is placed, this carrier being of skeleton formation and being provided with a movable catch $e^2$ (see Figure 15) for holding the ammunition in position vertically therein.

The said runway is circular and has two straight parallel extensions $e'$, $e'$ by which the said carrier can be moved to and from the room or place in which the ammunition is stored.

The lifting trays are of C cross section when viewed from the rear and the loading tray C is of reversed C cross section, with a portion between its ends cut away so that it can partly embrace the ammunition in either of the lifting trays whilst the ammunition remains in position in this lifting tray (see Figures 21 and 24.) The said loading tray is arranged to move transversely in the space existing between the two counter-balance weights $A^3$, $A^3$ of the cradle and is suspended from the upper one of these weights by means of rollers engaging with guides on the lower surface of this weight. The said tray is moved from its loading position to its receiving position and vice-versa by a hand-wheel $C'$ which operates upon the tray through the mechanism shewn in Figure 31, this mechanism comprising a splined shaft $c$ geared to the hand-wheel a bevel wheel $c'$ carried by a bracket on the tray and slidingly mounted on the shaft $c$, a second bevel wheel $c^2$ meshing with the bevel wheel $c'$ and a pinion $c^3$ connected to the bevel wheel and meshing with a fixed rack $c^3$.

The said loading tray is provided with a withdrawing device F which is in the form of a spring controlled pawl pivoted at $f$ to the said tray (see Figures 20, 21 and 24 to 26) and which, when the said tray partly embraces the ammunition in one of the lifting trays B B as shown in Figure 24, assumes a position to the left hand side of the ammunition to the latter tray so that when the loading tray is moved towards its loading position the said pawl will draw the ammunition from the lifting tray. This pawl is also adapted to operate the spring controlled retaining levers $4^4$, $B^4$ on the lifting tray B (which levers are somewhat similar to those hereinbefore described) in the following manner. The levers $B^4$, $B^4$ and are connected together by means of a rod $b^{4x}$ and arranged contiguous to a part $B^{4x}$ connected to the forward one of the said levers is an arm $F'$ pivoted to part of the tray B by a vertical pivot $f'$. During the outward movement of the loading tray C to its receiving position a projection $F^x$ on the rear face of the pawl F engages with the under surface of the arm $F'$ as shown in Figure 25 and when the said projection clears this arm the torsion spring $f^x$ (Figure 20) controlling the said pawl moves the latter into the position shewn in Figure 24 ready to draw the ammunition from the tray B. The retaining levers $B^4$, $B^4$ during this time remain in their retaining position. When the loading tray commences to move inwards towards its loading position the projection $F^x$ on the pawl F engages with the heel of the arm $F'$ and rocks the latter about its pivot so that its toe, by engaging with the part $B^{4x}$ appertaining to the forward lever $B^4$ (see Figure 26), displaces the two retaining levers into the free position shewn by chain lines in Figure 20. During this operation the pawl is drawing the ammunition from the lifting tray B and when the loading tray C moves clear of the tray B the ammunition is supported by the tray C and is prevented from rolling out by the pawl F. The retaining levers are returned to their normal retaining position, when the projection $F^x$ moves clear of the arm $F'$, by a spring $b^{o4}$ (Figures 20 and 21) operating on the rod $b^{4x}$.

A safety arrangement is provided for preventing the loading tray from being displaced from the loading position unless either of the lifting trays is in the correct transferring position. This arrangement which is shewn in detail in Figures 32 to 39 comprises a transverse shaft G carrying a stop piece $G'$ and two arms $g$, $g$, arranged in the path of projection $B^{o2}$, $B^{o2}$ disposed one on each of the lifting trays B, B the arrangement being such that when either of the said projections co-operating with its arm $g$ the stop piece $G'$ will be displaced from it operative position (shown in Figure 34) preventing the loading tray from being moved from its loading position, into the position shewn in Figure 32 in which this movement of the loading tray is permitted. The said stop piece forms part of the sleeve $g'$ which is made axially movable on the shaft and connected thereto by means of one or more short key and keyways arrangements $g^x$ (see Figures 36 and 38). When the loading tray C is being returned to its loading position after taking ammunition from either of the lifting trays B, B a spring plunger $G^x$ (see Figures 37 and 38) on the loading tray C comes into contact with an arm $g^x$ on the sleeve $g'$ and displaces the latter axially to disconnect it from the shaft G (see Figure 38) whereupon a torsion spring $G^x$ (Figure 38) operating between the shaft G and the sleeve $g'$ angularly displaces the latter into its operative position shewn in Figures 34 and 35 in which it holds the loading tray in the loading position. When the said lifting tray B is lowered a spring $g^{xx}$ operated upon the shaft G displaces the latter until the keys and keyways connecting the sleeve $g'$ to this shaft come into line again and the torsion spring $G^x$ of the sleeve $g'$ then pushes the latter back into its original position in engagement with the shaft (see Figure 39) so that when the other lifting tray reaches the discharging position the co-operation of the projection $B^{o2}$ of this tray with its arm $g$ on the shaft G will move the stop piece G' to its free or inoperative position in the manner stated above.

The lifting trays B, B are adapted to be locked when in the transferring position by spring catches H, H (Figures 40 and 41) carried by part of the cradle and adapted to engage in recesses $b^{xx}$, $b^{xx}$ formed in projections $B^{xx}$, $B^{xx}$ on the trays. The said catches are connected together by links $h$, $h$ and are controlled by a spring $h'$ operating on the inner one of these catches. The catches are retracted by the engagement of a pawl $C^o$ on the loading tray C with projections $h^o$ on the links $h$ when the loading tray is being moved to its loading position, and the said pawl is tripped out of engagement by the co-operation of a toe $c^o$ thereon with a projection $a^o$ on a fixed part carrying the inner catch H. This is the condition of affairs shewn in Figure 41. The catches are held in the retracted position by a spring plunger $h^3$ which is released to allow the catches to move outwards during the completion of the upward movement and the commencement of the downward movement of the inner one of the lifting trays by means of cam surfaces $b^o$, $b^{oo}$ on the projection $B^{xx}$ on this tray, the said cam surfaces operating on the plunger $h^2$ through a bell-crank lever $h^3$.

A safety device is provided for preventing the loading tray C from assuming its loading position whilst the breech is closed and for preventing the breech from being closed unless the loading tray is clear of the breech block which, in the example shewn, is of the wedge or sliding type. This safety device is shewn in Figures 27 and 30 and comprises a cam K on the breech actuating shaft K' which can co-operate with one end of a transverse rod $K^2$ slidably carried by part of the cradle. The other end of this rod has a projection $K^3$ disposed in a slot $k$ in a plate $k'$ connected to a shaft $k^2$ the rear end of which carries an arm $k^3$ having a slotted end adapted to co-operate with a pin $c^{oo}$ on the loading tray C. During the outward movement of the loading tray to the position to receive ammunition from the inner one of the two lifting trays, the pin $c^{oo}$ by its engagement with the slotted end of the arm $k^3$ displaces the plate $k'$ into the position shewn in Figures 29 and 29ª in which the rod $K^2$ is held clear of the step on the cam K so that the breech can then be closed. During the further movement of the loading tray in the outward direction to receive ammunition from the outer lifting tray the arm $k^3$ is held in the position shewn in Figure 20 by the co-operation of the end of this arm with an extension $C^{oo}$ of the loading tray C. In this position of the parts a corner on the projection $K^3$ (see Figure 29ª) bears against a shoulder $k^x$ in the groove $k$ and the other end of the rod $K^2$ bears against the periphery of the cam K when the breech is closed as shewn in full lines in Figure 28, so that the loading tray C is prevented from being moved to its loading position while the breech is closed. When the breech is opened, however, the cam K occupies the position shewn by chain lines in Figure 28 and the loading tray can then be moved to its loading position during which movement the end of the rod $K^2$ reaches the position shewn by chain lines in Figure 28 in which it lies in front of the stop on the cam K. In this position of the parts the breech cannot be closed and closing is only permitted when the end of the rod $K^2$ has been retracted out of the path of the stop on the cam K, that is to say when the loading tray has been moved to the position shewn in Figure 29 or outwards beyond this position.

Arranged on the lower balance weight $A^3$ of the cradle there is a curved plate L (Figures 27, 29 and 30) which is pivoted about a longitudinal axis $l$ and serves to bridge the gap between the ends of the loading tray C so as to form a guide for the flange of the cartridge case during ramming, this plate being controlled by a spring L' so that when the loading tray is moved from its loading position the plate will be displaced by the spring into a position to enable the ammunition to reach the ramming position, the said plate being returned to its original position by the engagement therewith of part of the loading tray as the latter assumes its loading position. The said lower balance weight of the cradle is also provided with a buffer M (Figures 27, 38 and 31) for the cartridge case during ejection, this buffer being carried by a lever controlled by a spring M' in such a manner that when the loading tray moves from its loading position the buffer is moved into its operative position; the said buffer is displaced to its inoperative position by the engagement therewith of the loading tray during the movement of the latter to its loading position.

We wish it to be understood that certain of the devices described above in connection with the constructional form of the invention in which two lifting trays are employed may also be used in conjunction with an arrangement in which only one lifting tray is employed, it being obvious that any features which are dependent for their use or function upon the employment of the two lifting trays would not in such case be used.

What we claim and desire to secure by Letters Patent of the United States is:—

1. In ammunition hoisting apparatus for ordnance, the combination of a member for raising ammunition to a position contiguous to the breech end of the gun and means for pivoting said member so that it can move about an axis transverse to the gun from a substantially vertical receiving position into a transferring position substantially parallel to the gun.

2. In ammunition hoisting and loading apparatus for ordnance, the combination of a member for raising ammunition to a position contiguous to the breech end of the gun, means for pivoting said member so that it can move about an axis transverse to the gun, and a transversely movable loading tray for conveying ammunition from said member, when the latter occupies its transferring position, into a position in line with the bore of the gun for ramming therein.

3. In ammunition hoisting and loading apparatus for ordnance, the combination of a member for raising ammunition to a position contiguous to the breech end of the gun, means for pivoting said member so that it can move at the side of the gun about an axis transverse to the gun from a substantially vertical receiving position into a transferring position substantially parallel to the axis of the gun and a transversely movable loading tray for conveying ammunition from said member, when the latter occupies its transferring position, into a position in line with the bore of the gun for ramming therein.

4. In ammunition hoisting and loading apparatus for ordnance, the combination of a receptacle for raising ammunition to a position contiguous to the breech end of the gun, an arm carrying said receptacle, means for pivoting said arm so that it can move at the side of the gun about an axis transverse to the gun from a substantially vertical receiving position into a transferring position substantially parallel to the axis of the gun, and a transversely movable loading tray for conveying ammunition from said member, when the latter occupies its transferring position, into a position in line with the bore of the gun for ramming therein.

5. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein and hand operated means on said lifting tray for causing the ammunition to be rolled from this tray on to the loading tray.

6. In ammunition hoisting apparatus for ordnance, the combination of a member for raising ammunition to a position contiguous to the breech end of the gun, means for pivoting said member so that it can move about an axis transverse to the gun, a device for preventing the ammunition from leaving said member until the latter occupies its correct raised position and means for automatically moving said device to its inoperative position as the said member reaches its said raised position.

7. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a device for preventing the ammunition from rolling out of said lifting tray and means for automatically moving said device to its inoperative position as the lifting tray reaches its transferring position.

8. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a device for preventing the ammunition from rolling out of said lifting tray, means for automatically moving said device to its inoperative position as the lifting tray reaches its transferring position, and hand operated means on said lifting tray for causing the ammunition to be rolled from this tray on to the loading tray.

9. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein and a withdrawing device on said loading tray for engaging with the ammunition in the lifting tray and withdrawing it therefrom during the movement of said loading tray towards the loading position.

10. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein and a spring controlled pawl on said loading tray for engaging with the ammunition in the lifting tray and withdrawing it therefrom during the movement of said loading tray towards its loading position.

11. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a withdrawing device on said loading tray for engaging with the ammunition in the lifting tray and withdrawing it therefrom during the movement of said loading tray towards the loading position, and means whereby said loading tray partly embraces the ammunition in the lifting tray when the loading tray occupies the receiving position with said withdrawing device in position for withdrawing the ammunition from the lifting tray.

12. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a withdrawing device on said loading tray for engaging with the ammunition in the lifting tray and withdrawing it therefrom during the movement of said loading tray towards the loading position, a retaining device for preventing the ammunition from rolling out of said lifting tray and means whereby said retaining device is automatically moved to its inoperative position during the first part of the movement of said loading tray towards its loading position behind the gun.

13. In ammunition hoisting and loading apparatus for ordnance, the combination of a lifting tray for raising ammunition to a position contiguous to the breech end of the gun, means for pivoting said member so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a withdrawing device on said loading tray for engaging with the ammunition in the lifting tray and withdrawing it therefrom during the movement of said loading tray towards the loading position, a retaining device for preventing the ammunition from rolling out of said lifting tray and means whereby said withdrawing device operates to move said retaining device to its inoperative position during the first part of the movement or said loading tray towards its loading position.

14. In ammunition hoisting and loading apparatus for ordnance, the combination of a lifting tray for raising ammunition to a position contingous to the breech end of the gun, means for pivoting said member so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a withdrawing device on said loading tray for engaging with the ammunition in the lifting tray and withdrawing it therefrom during the movement of said loading tray towards the loading position, and a curved plate carried by a part which does not move laterally with said loading tray, said plate when the loading tray occupies its loading position behind the gun, serving to bridge a gap formed in the loading tray for enabling the latter to embrace the ammunition in the lifting tray when the loading tray occupies the receiving position with said withdrawing device in position for withdrawing the ammunition from the lifting tray.

15. In ammunition hoisting and loading apparatus for ordnance, the combination of a lifting tray for raising ammunition to a position contiguous to the breech end of the gun, means for pivoting said tray so that it can move at the side of the gun about an axis transverse to the gun from a substantially vertical receiving position into a transferring position substantially parallel to the axis of the gun, a transversely movable loading tray for conveying ammunition from said lifting tray, when the latter occupies its transferring position, into a loading position in line with the bore of the gun for ramming therein, a withdrawing device on said loading tray for engaging with the ammunition in the lifting tray and withdrawing it therefrom during the movement of said loading tray towards the loading position, a curved plate carried by part of the gun cradle said plate, when the loading tray occupies its loading position, serving to bridge a gap formed in the loading tray for enabling the latter to embrace the ammunition in the lifting tray when the loading tray occupies the receiving position with said withdrawing device in position for withdrawing the ammunition from the lifting tray, means for pivoting said plate about an axis parallel to the axis of the gun, and a spring controlling said plate.

16. In ammunition hoisting and loading apparatus for ordnance, the combination of a lifting tray for raising ammunition to a transferring position continguous to the breech end of the gun, a loading tray for carrying the ammunition from the lifting tray to a loading position for ramming into the gun and a device for preventing the loading tray from being displaced from its loading position unless the lifting tray is in the correct transferring position.

17. In ammunition hoisting and loading apparatus for ordnance, the combination of a lifting tray for raising ammunition to a transferring position contiguous to the breech end of the gun, means for pivoting said tray so that it can move at the side of the gun about a transverse axis, a loading tray for carrying the ammunition from the lifting tray to a loading position for ramming into the gun and a device for preventing the loading tray from being displaced from its loading position unless the lifting tray is in the correct transferring position.

18. In ammunition hoisting and loading apparatus for ordnance, the combination of a lifting tray for raising ammunition to a transferring position contiguous to the breech end of the gun, a transversely movable loading tray for carrying the ammunition from the lifting tray into a loading position for ramming into the gun, a stop piece normally preventing movement of said loading tray from its loading position and means whereby said lifting tray displaces said stop piece into its inoperative position as this tray assumes its transferring position.

19. In ammunition hoisting and loading apparatus for ordnance, the combination of a lifting tray for raising ammunition to a transferring position contiguous to the breech end of the gun, a loading tray for carrying the ammunition from the lifting tray to a loading position for ramming into the gun, a device for preventing the loading tray from being displaced from its loading position unless the lifting tray is in the correct transferring position, the breech block, the breech block actuating mechanism and a safety device coacting with said mechanism for preventing said loading tray from assuming its loading position whilst the breech is closed and for preventing the breech from being opened unless the loading tray is clear of the breech block.

20. In ammunition hoisting and loading apparatus for ordnance, the combination of a lifting tray for raising ammunition to a transferring position contiguous to the breech end of the gun, a loading tray for carrying the ammunition from the lifting tray to a loading position for ramming into the gun, a device for preventing the loading tray from being displaced from its loading position unless the lifting tray is in the correct transferring position, the breech block, the shaft for actuating the breech block, a cam on said shaft, a projection on the loading tray, a slotted arm for engaging with said projection and mechanism interposed between said arm and said cam whereby said arm prevents the loading tray from assuming its loading position whilst the breech is closed and also prevents the breech from being opened unless the loading tray is clear of the breech block.

21. In ammunition hoisting apparatus for ordnance, the combination of two members for raising ammunition to a position contiguous to the breech end of the gun, means for pivoting said members so that each of them can move about an axis transverse to the gun and means for independently operating said members.

22. In ammunition hoisting apparatus for ordnance, the combination of two members for raising ammunition to a position contiguous to the breech end of the gun, means for pivoting said members so that each of them can move about an axis transverse to the gun from a substantially vertical receiving position into a transferring position substantially parallel to the gun, and means for independently operating said members.

23. In ammunition hoisting apparatus for ordnance, the combination of two members for raising ammunition to a position contiguous to the breech end of the gun, means for pivoting said members so that each of them can move at one side of the gun about an axis transverse to the gun from a substantially vertical receiving position into a transferring position substantially parallel to the gun and means for independently operating said members.

24. In ammunition hoisting and loading apparatus for ordnance, the combination of two members for raising ammunition to a position contiguous to the breech end of the gun, means for pivoting said members so that each of them can move at one side of the gun about an axis transverse to the gun from a substantially vertical receiving position into a transferring position substantially parallel to the gun, means for independently operating said members and means for conveying ammunition from whichever of said members occupies the transferring position, into a position behind the bore of the gun for ramming therein.

25. In ammunition hoisting and loading apparatus for ordnance, the combination of two members for raising ammunition to a position contiguous to the breech end of the gun, means for pivoting said members so that each of them can move at one side of the gun about an axis transverse to the gun from a substantially vertical receiving position into a transferring position substantially parallel to the gun, means for independently operating said members and a transversely movable loading tray for conveying ammunition from whichever of said members occupies the transferring position, into a position behind the bore of the gun for ramming therein.

26. In ammunition hoisting apparatus, the combination with the elements claimed in claim 23, of safety stops for preventing one of the ammunition raising members from reaching its transferring position while the other member occupies its transferring position.

27. In ammunition hoisting apparatus, the combination with the elements claimed in claim 23, of spring controlled bolts for preventing one of the ammunition raising members from reaching its transferring position while the other member occupies its transferring position, said bolts having beveled faces upon which each of said members operates as it assumes the transferring position.

28. In ammunition hoisting apparatus for ordnance, the combination with the gun cradle, of a member for raising ammunition to a position contiguous to the breech end of the gun, means for pivoting said member so that it can move about an axis transverse to the gun from a substantially vertical receiving position into a transferring position substantially parallel to the gun, and means for locking said member to the cradle when this member occupies the transferring position.

29. In ammunition hoisting apparatus for ordnance, the combination with the gun cradle, of a member for raising ammunition to a position contiguous to the breech end of the gun, means for pivoting said member so that it can move about an axis transverse to the gun from a substantially vertical receiving position into a transferring position substantially parallel to the gun, and a spring controlled catch for locking said member to the cradle when this member occupies the transferring position.

30. In ammunition hoisting and loading apparatus for ordnance, the combination with the gun cradle, of a member for raising ammunition to a position contiguous to the breech end of the gun, means for pivoting said member so that it can move about an axis transverse to the gun from a substantially vertical receiving position into a transferring position substantially parallel to the gun, a transversely movable loading tray for conveying ammunition from said member to the loading position in line with the bore of the gun for ramming therein, a spring controlled catch for locking said member to the cradle when this member occupies the transferring position and means whereby said catch is moved to the disengaging position by the movement of said loading tray towards the loading position.

31. In ammunition hoisting and loading apparatus, the combination with the elements claimed in claim 30, of a spring controlled plunger co-operating with the catch to hold the latter in the retracted position and means whereby the pivoted ammunition raising member automatically operates upon said plunger to release said catch.

32. In ammunition hoisting apparatus for ordnance, the combination of a member for raising ammunition to a position contiguous to the breech end of the gun, means for pivoting said member so that it can move about an axis transverse to the gun from a substantially vertical receiving position into a transferring position substantially parallel to the gun and a rammer for loading the ammunition endwise on to said member when the latter occupies its receiving position.

33. In ammunition hoisting apparatus for ordnance, the combination of a member for raising ammunition to a position contiguous to the breech end of the gun, means for pivoting said member so that it can move about an axis transverse to the gun from a substantially vertical receiving position into a transferring position substantially parallel to the gun, a rammer for loading the ammunition endwise on to said member when the latter occupies its receiving position, a tube through which the ammunition passes to said member, a door normally closing said tube, means whereby said door is opened by said member as the latter assumes its receiving position and means whereby said door is closed automatically as said member leaves its receiving position.

34. In ammunition hoisting apparatus for ordnance, the combination of a member for raising ammunition to a position contiguous to the breech end of the gun, means for pivoting said member so that it can move about an axis transverse to the gun from a substantially vertical receiving position into a transferring position substantially parallel to the gun, a rammer for loading the ammunition endwise on to said member when the latter occupies its receiving position and an ammunition holder disposed between said rammer and said member.

35. In ammunition hoisting apparatus for ordnance, the combination of a member for raising ammunition to a position contiguous to the breech end of the gun, means for pivoting said member so that it can move about an axis transverse to the gun from a substantially vertical receiving position into a transferring position substantially parallel to the gun, a rammer for loading the ammunition endwise on to said member when the latter occupies its receiving position and a rotary ammunition holder disposed between said rammer and said member and provided with compartments any one of which can be brought into line with said rammer by rotating said holder.

36. In ammunition hoisting apparatus for ordnance, the combination of a member for raising ammunition to a position contiguous to the breech end of the gun, means for pivoting said member so that it can move about an axis transverse to the gun from a substantially vertical receiving position into a transferring position substantially parallel to the gun, a rammer for loading the ammunition endwise on to said member when the latter occupies its receiving position, a rotary ammunition holder disposed between said rammer and said member and provided with compartments any one of which can be brought into line with said rammer by rotating said holder, means for pivoting said holder to a part moving with the gun in training, a stationary circular rail, an ammunition carrier which runs on said rail and supplies the holder with ammunition, and two parallel extensions of said rail on which extensions said carrier moves to and from the place where the ammunition is stored.

37. In ammunition hoisting apparatus for ordnance, the combination of two members for raising ammunition to a position contiguous to the breech end of the gun, means for pivoting said members so that each of them can move about an axis transverse to the gun from a substantially vertical position into a transferring position substantially parallel to the gun, means for independently operating said members and two rammers for loading the ammunition endwise on to said members when the latter occupy their receiving positions.

38. In ammunition hoisting apparatus for ordnance, the combination of two members for raising ammunition to a position contiguous to the breech end of the gun, means for pivoting said members so that each of them can move about an axis transverse to the gun from a substantially vertical position into a transferring position substantially parallel to the gun, means for independently operating said members, two rammers for loading the ammunition endwise on to said members when the latter occupy their receiving positions and means for preventing the operation of either of these rammers except when the ammunition raising member appertaining to that particular rammer is in the correct receiving position.

39. In ammunition hoisting apparatus for ordnance, the combination of two members for raising ammunition to a position contiguous to the breech end of the gun, means for pivoting said members so that each of them can move about an axis transverse to the gun from a substantially vertical position into a transferring position substantially parallel to the gun, means for independently operating said members, two rammers for loading the ammunition endwise on to said members when the latter occupy their receiving positions, winches for operating said rammers and means for preventing the operation of either of these winches except when the ammunition raising member appertaining to that particular winch is in the correct receiving position.

40. In ammunition hoisting apparatus for ordnance, the combination of two members for raising ammunition to a position contiguous to the breech end of the gun, means for pivoting said members so that each of them can move about an axis transverse to the gun from a substantially vertical position into a transferring position substantially parallel to the gun, means for independently operating said members, two rammers for loading the ammunition endwise on to said members when the latter occupy their receiving positions, winches for operating said rammers, a device for preventing the operation of either of these winches except when the ammunition raising member appertaining to that particular winch is in the correct receiving position and means for preventing said device from permitting the operation of that winch, when the said member is in the receiving position and is already carrying ammunition.

ARTHUR TREVOR DAWSON.
GEORGE THOMAS BUCKHAM.